United States Patent
Doumaux et al.

(10) Patent No.: US 8,334,329 B2
(45) Date of Patent: Dec. 18, 2012

(54) BINDERS FOR PIGMENTED INK FORMULATIONS

(75) Inventors: Howard A. Doumaux, San Diego, CA (US); Zeying Ma, San Diego, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 12/777,560

(22) Filed: May 11, 2010

(65) Prior Publication Data

US 2010/0222499 A1  Sep. 2, 2010

Related U.S. Application Data

(62) Division of application No. 11/551,578, filed on Oct. 20, 2006.

(51) Int. Cl.
*C09D 11/00* (2006.01)

(52) U.S. Cl. .................. 523/160; 523/161; 524/561

(58) Field of Classification Search .................. 523/160, 523/161
See application file for complete search history.

(56) References Cited

U.S. PATENT DOCUMENTS

| | | | |
|---|---|---|---|
| 4,956,258 A | 9/1990 | Watanabe et al. |
| 5,085,698 A | 2/1992 | Ma et al. |
| 5,607,999 A | 3/1997 | Shimizu et al. |
| 5,760,124 A | 6/1998 | Listigovers et al. |
| 5,849,815 A | 12/1998 | Aoki et al. |
| 5,869,564 A | 2/1999 | Beach et al. |
| 5,900,899 A | 5/1999 | Ichizawa et al. |
| 6,020,400 A | 2/2000 | Anton et al. |
| 6,040,358 A | 3/2000 | Page et al. |
| 6,128,450 A | 10/2000 | Suetsugu |
| 6,154,620 A | 11/2000 | Hagiwara |
| 6,245,832 B1 | 6/2001 | Suzuki et al. |
| 6,281,267 B2 | 8/2001 | Parazak |
| 6,306,994 B1 | 10/2001 | Donald et al. |
| 6,406,143 B1 | 6/2002 | Chen et al. |
| 6,765,039 B1 | 7/2004 | Basak et al. |
| 7,459,491 B2 | 12/2008 | Tyvoll et al. |
| 2002/0193487 A1 | 12/2002 | Sakurai et al. |
| 2003/0195274 A1 | 10/2003 | Nakamura et al. |
| 2003/0225185 A1* | 12/2003 | Akers et al. .................. 523/160 |
| 2005/0134665 A1 | 6/2005 | Wang et al. |
| 2005/0141910 A1 | 6/2005 | Chou et al. |
| 2005/0176846 A1 | 8/2005 | Sato et al. |
| 2005/0282928 A1 | 12/2005 | Lin et al. |

FOREIGN PATENT DOCUMENTS

| | | |
|---|---|---|
| EP | 0556649 | 8/1993 |
| EP | 0556650 | 8/1993 |
| EP | 1586611 | 10/2005 |
| EP | 1650271 | 4/2006 |
| EP | 1676893 | 7/2006 |
| EP | 0819738 | 2/2009 |
| JP | 06027069 | 2/1994 |
| JP | 2006214975 | 8/2006 |

OTHER PUBLICATIONS

Spinelli, Harry J., "Polymeric dispersants in ink jet technology" Advanced Materials, vol. 10, No. 15, 1998, pp. 1215-1218, Weinheim Germany.
Database WPI Week 199719, Derwent Publication Ltd., London, GB; AN1997-208251; XP002470850 & JP09058107A (Dainichiseika Color 7 Chem Mfg) Mar. 4, 1997 abstract.
Database WPI Week 200370, Derwent Publication Ltd., London, GB; AN2003-736270; XP002470851 & JP20030192965A (Seiko Epson Corp) Jul. 9, 2003 abstract.
Database WPI Week 200468, Derwent Publication Ltd., London, GB; AN2004-694227; XP002470909 & JP2004269799A (Canon KK) Sep. 30, 2004 abstract.
Database WPI Week [Online] Chemical Abstracts Service, Columbus, OH, US; Fang et al; XP002470908; CN1687258; Oct. 26, 2005.

* cited by examiner

Primary Examiner — Doris Lee

(57) ABSTRACT

Disclosed herein are inks including an aqueous vehicle; at least one encapsulant-dispersed pigment; and at least one block copolymer binder dispersed throughout the aqueous vehicle and having Structure I and comprising a hydrophobic block (A) and a hydrophilic block (B).

STRUCTURE I

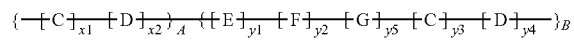

$$\{-[-C\frac{}{x_1}-D\frac{}{x_2}-]_A-([-E\frac{}{y_1}-F\frac{}{y_2}-G\frac{}{y_5}-C\frac{}{y_3}-D\frac{}{y_4}-]_B\}$$

4 Claims, No Drawings

BINDERS FOR PIGMENTED INK FORMULATIONS

This application is a divisional of U.S. patent application Ser. No. 11/551,578 filed on Oct. 20, 2006.

FIELD OF THE INVENTION

The present invention generally relates to ink-jet printing, and in particular, to inkjet inks and ink sets using dispersed pigments.

BACKGROUND OF THE INVENTION

The use of digital image-forming apparatuses such as, for example, thermal ink-jet printers, large-format plotters, piezo-electric printers, large form plotters, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business and household applications at costs lower than those offered in the past.

Print media such as those used in off-set printing are smooth and glossy due to a nonporous coating on the surface of the media. The nonporous coating is a hydrophobic material, such as a hydrophobic polymer. Since this coating is hydrophobic, inks used in these types of commercial printing are typically oil-based. In contrast, the majority of inks used in inkjet printing are aqueous-based. These inkjet inks are generally not compatible with the existing non-inkjet commercial print media because the aqueous-based inkjet inks do not penetrate into the nonporous coating, in particular in the fast throughput environment. Therefore, in order to print commercial volumes using inkjet printing, modified inkjet inks for use on non-inkjet compatible commercial print media have been developed. However, images printed with these inkjet inks may have reduced resolution, durability, or print quality.

Due to the cost, higher lead time requirements, and efficiency limitations of these other non-inkjet printing techniques, commercial printing (including digital printing) using inkjet printers ("commercial inkjet") is a rapidly developing area. The large volumes of items that are printed in commercial inkjet printing require high speed of the printing process. Reliable printer pens that do not need frequent servicing are also necessary because they contribute to the overall speed of the printing process.

It would be desirable to provide printing inks for use in ink jet printers with improved print quality and reliability performance, in particular for use in commercial inkjet printing as well as personal printing for home use.

SUMMARY

The present invention is directed to printing liquids and polymeric binders for formulating the same. In an embodiment, the printing liquids are inkjet inks for use in inkjet printing including thermal and piezo systems. In an embodiment, the inkjet inks are formulated for use in thermal inkjet printing and provide improved desirable performance properties such as low viscosity, better decap performance, and superior bubble tolerance.

The inks formulated according to the present invention, include at least an aqueous vehicle; at least one encapsulant-dispersed pigment; and at least one block copolymer binder dispersed throughout the aqueous vehicle and having Structure I comprising a hydrophobic block (A) and a hydrophilic block (B):

STRUCTURE I

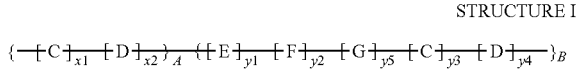

Wherein
C is

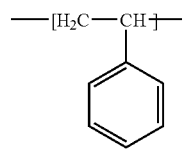

D is

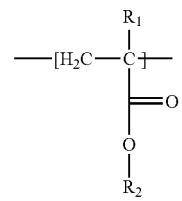

E is

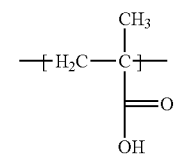

F is

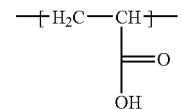

G is

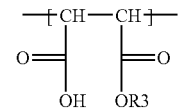

x1-x2 and y1-y5 are independently selected to be equal to or greater than zero (0);

R1 is H or CH3;

R2 is alkyl, or aryl group wherein the number of carbon atoms ranges from 0 to about 20; including benzyl, butyl, or ester groups;

R3 is H, an alkyl group of from 1 to about 15 carbon atoms, an aryl group of from about 6 to about 18 carbon atoms; including arylalkyl, polydimethylsiloxane, polyethylene glycol chain, or a polypropylene glycol chain.

DETAILED DESCRIPTION OF EMBODIMENTS OF THE INVENTION

The present invention is directed to structured copolymers as binders. Hereinafter the term ink will be used to further describe the invention but its usage is not intended to limit the scope of the invention. The inks formulated according to the present invention include at least an aqueous vehicle; at least one encapsulant-dispersed pigment; and at least one block copolymer binder dispersed throughout the aqueous vehicle. In an embodiment the liquid is usable in inkjet printing (e.g. either or both piezoelectric and thermal inkjet apparatus) using commercially available inkjet printers such as the DESKJET®, DESIGNJET®, and PHOTOSMART® families of printers; manufactured by Hewlett-Packard Company of Delaware.

In an embodiment, the pigment dispersions are dispersed with polymeric dispersants having the same chemical structure as the binder or differ from the binder in structure, ratio of monomers, molecular weight, acid number, and the like. As used herein, the term binder refers to the polymer dispersed throughout the vehicle; encapsulant refers to the polymer material (dispersant) encapsulating the pigment. The term resin, as used herein, includes at least the binder, and may further include the encapsulant/dispersant. The pigment may include any one or more hues including black, cyan, magenta, yellow, and combinations thereof, or any other suitable hue.

The inks of the present invention provide printed images having a high print quality at high throughput rates and enhanced reliability performance. Without intending to limit the scope of the present invention, it is contemplated that the viscosity of the ink composition can be lowered when the polymeric encapsulants and free polymeric binders are chemically similar. Without being bound to any theory, it is believed that this reduction in viscosity can be due in part to the addition of the chemically similar free polymeric binders which can substantially reduce electrostatic and/or electrosteric interactions between the encapsulant and the vehicle.

It was found by the present inventors that block copolymer binders having increased hydrophobic groups with low Tg (glass transition temperature) may restrain or minimize the onset of undesirable effects such as low dispersion stability.

The inks of the present invention are particularly useful for imaging and photo printers, including commercial inkjet printers. The inks of the present invention are useful for printing on porous, non-porous, and hybrid glossy media and semi-glossy media, as well as micro-porous media for use in commercial inkjet printing applications such as graphic arts and photo retail requiring high throughput and high image quality as well as home photo printers. Exemplary print media include, but are not limited to, Hewlett-Packard Advanced glossy Photo Paper, Iford Galerie Pearl Photo Inkjet Paper (semi-gloss), Epson Premium Glossy Photo Paper, and Pictorico Photo Gallery glossy paper.

In an embodiment, the printing liquid is an aqueous ink including a colorant dispersed with a dispersant/encapsulant having similar chemical structure as the binders according to the present invention. The term "chemically similar" as used herein denotes compounds that have the same or similar molecular weight, acid number, and/or monomer composition. It is to be understood that "similar" in regard to molecular weights as defined herein is contemplated to encompass compounds having molecular weights ranging from about 2,000 to about 20,000, or from about 5,000 to about 15,000, or from about 8,000 to about 11,000. In one exemplary embodiment, the encapsulating polymer (dispersant) has a higher molecular weight than the free polymer binder.

As used herein, the term "printed substrate" means a substrate that is at least partially covered with at least one ink embodying features of the invention. "Inkjet pen" means an inkjet pen which has either or both on-axis and off-axis configurations, including and/or configured to include the ink. "Printing system" means a system for printing and/or including at least one or more of the inkjet inks embodying one or more features of the present invention, inkjet pen, and/or printer.

Inks made according to the present invention provide many advantages such as enhanced pigment stability and image gloss and reduced bronzing, enabling the use of a broad range of pigments, lower viscosity dispersions improving reliability and allowing high pigment loadings for excellent color performance in low drop volume printheads usable for generating higher resolution images.

Polymers

The resin polymers according to the present invention may generally be classified into three groups, as described further below. As used herein, the term resin includes the binder and may further be used to refer to polymers used for encapsulating/dispersing the pigments (encapsulant). It should be understood that for purposes of description, described polymers may be used as resins for use at least as binders but may further include encapsulants (dispersants).

I. Random, Unstructured Polymer Resin:

Random unstructured polymers may be used, and made according to methods known to those skilled in the art, including all acrylate systems and adhesion promoting monomers to further enhance and improve the encapsulated pigment ink stability and performance.

II. Structured Polymer Resins:

Structured polymers may be used having a block nature wherein the polymer is segmented, with the segments having substantial composition difference between the various segments.

The block polymers may be designed to include at least two blocks, namely A and B blocks. In an embodiment, the hydrophobic block A has a glass transition temperature ranging generally from about 0 to about 70 degrees Celsius (° C.), normally from about 10 to about 65° C.

III. Graft Polymer Resins:

Random polymers with macromonomer side chains grafted onto a backbone may be used in the practice of the invention. The side chains may be either or both PEG-acrylate macromonomers and those with terminal alkene (i.e., olefin) group.

The graft polymers may be designed to include a substantially hydrophobic backbone; and hydrophilic macromonomer side chains.

Resin Copolymer Designs

The copolymers embodying features of the present invention may generally include any one or more of structures I-VII below:

STRUCTURE I

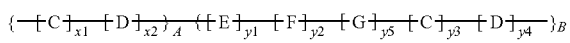

Wherein

C is

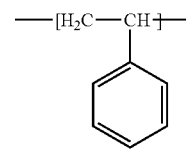

D is

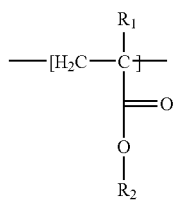

E is

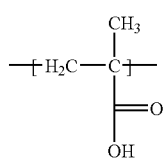

F is

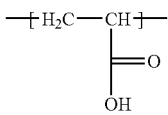

G is

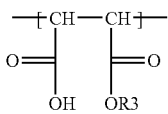

x1-x2 and y1-y5 are independently selected to be equal to or greater than zero (0);
R1 is H or CH3;
R2 is alkyl, or aryl group wherein the number of carbon atoms ranges from 0 to about 20; including benzyl, butyl, or ester groups;
R3 is H, an alkyl group of from 1 to about 15 carbon atoms, an aryl group of from about 6 to about 18 carbon atoms; including arylalkyl, polydimethylsiloxane, polyethylene glycol chain, or a polypropylene glycol chain.
Structure I may further be described as Structures II-V.

Polymers according to structure II represent an embodiment of polymers according to the present invention. Structure II may be modified, as further described below, and represented by Structures III and IV below by adding or removing components.

Structure II, as can be seen includes, at least, components C, D, E, F. In addition it includes R1 and R2 groups, as for example described in reference to Structure I.

STRUCTURE III

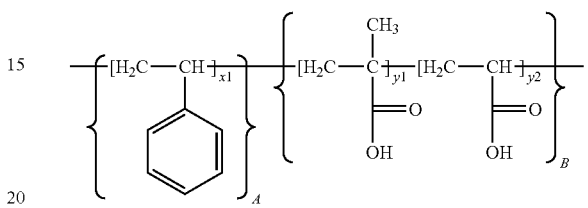

The copolymers having structure III include at least two blocks having A and B groups. The polymers having structure III normally have a molecular weight ranging from about 1000 to about 20,000. In an embodiment, the polymer has an acid number ranging from about 130 to about 200 mg KOH/g polymer. As can be noted in comparing between Structure II and III, in the latter, x2 and y3-y5 (per Structure I) are zero (0).

STRUCTURE IV

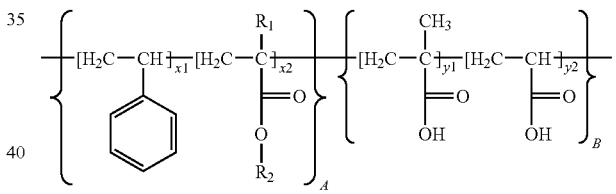

The copolymers having structure IV, include at least two blocks having A and B groups. Polymers according to Structure IV, have an acrylic ester segment added to the hydrophobic block A. As can be noted in comparing Structure II and IV, in the latter, y3-y5 (per Structure I) are zero (0).

The polymers having structure IV normally have a molecular weight ranging from about 5000 to about 20,000. In an embodiment, the polymer has an acid number ranging from about 130 to about 200 mg KOH/g polymer.

STRUCTURE II

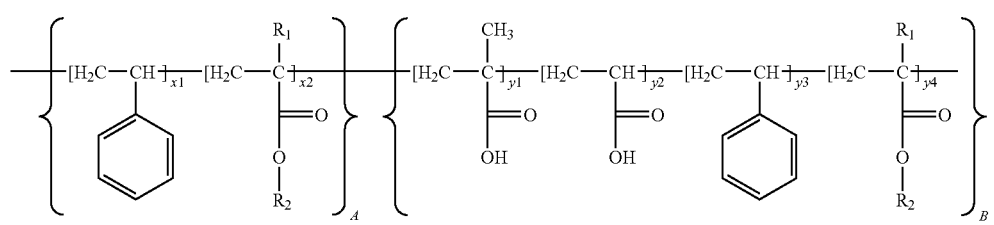

STRUCTURE V

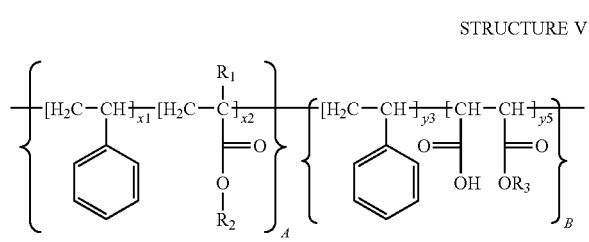

As can be noted in comparing Structures I and V, in the latter y1, y2, and y4 (per Structure I) are zero (0).

Polymers made according to Structure V have high glass transition temperature. However, glass transition temperature can be lowered especially when neutralized to the half-ester form, such as the SMA-1440. The A block provides total, or at least substantial, hydrophobicity. The B block comprises styrene/maleic anhydride copolymers ("SMA") structure which imparts a pen-friendly (ink-jet pen or nozzle structure) composition. The B block may have the structures of SMA-1440. SMA structures are further described in U.S. Pat. No. 6,406,143 B1 issued to Chen et al., the entire content of which is incorporated herein by reference.

STRUCTURE VI

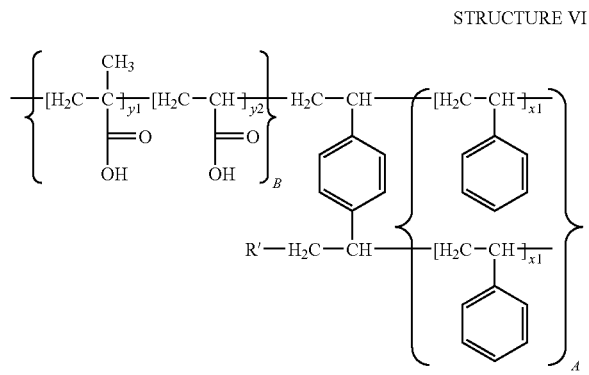

Polymers made according to Structure VI include bifunctional styrene/acrylate/methacrylate which may be used for double chained binders (and in some embodiments also as dispersants). The double chains can either be the hydrophobic or hydrophilic segments. R' may be halogen or an alkyl derivative group, provided that when a vinyl benzyl chloride group is used, R'-CH2 is not present and the R'CH2CH group becomes CH2.

In an embodiment, polymeric resins used as binders (and in some embodiments also as dispersants) embodying features of the present invention have structure VII:

STRUCTURE VII

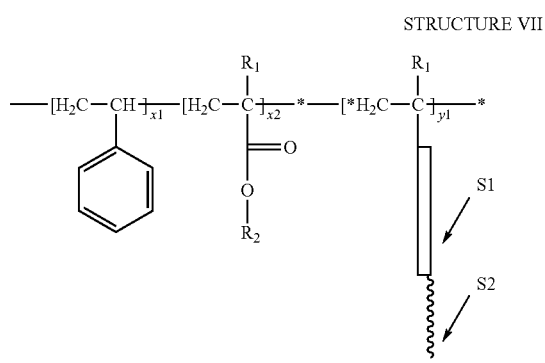

Polymers made according to Structure VII include random or blocked structures, depending on whether the small monomers are needed as spacers for the incorporation of reactive surfactant; with S1 and S2 representing a surfactant with hydrophobic S1 and hydrophilic S2 segments.

In an embodiment, Structure VII may have Structure VIII with methoxy ethylene glycol acrylate, SCT-made macromonomers including MAA, AA, or other suitable monomers.

STRUCTURE VIII

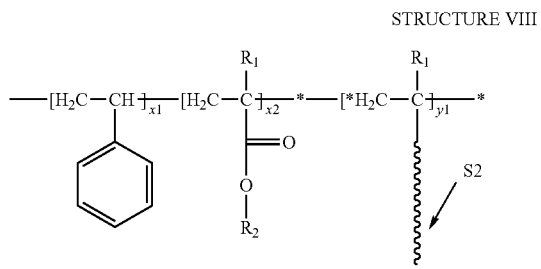

Process

The CRP (Controlled Radical Polymerization) technologies, such as ATRP (atom transfer radical polymerization), NMP (Nitroxide Mediated Polymerization), and RAFT (Reversible Addition Fragmentation Chain Transfer) may be used to synthesize the block copolymers, usable in the structure polymers as blocks A and B, as well as graft polymer backbone and side chain.

These methods of synthesis have been described in various literature and are practicable by those skilled in the art.

Inks

The aqueous ink jet inks made according to the present invention employ an aqueous carrier medium ("vehicle"), a dispersed or encapsulated colorant, and a resin binder according to polymers embodying features of the present invention. The colorant may be a dispersed pigment using any suitable dispersant (dispersant) or a self-dispersed pigment. In an embodiment, the dispersant has similar chemical structure as the binders according to the present invention. The inks may also contain other additives known in the art of ink jet printing.

Colorant

The colorant may be dispersed using a dispersant having similar chemical structure as the binders according to the present invention. More than one pigment may be used in the ink formulation. Preferably, the ink includes a pigmented colorant suitable for use in inkjet formulations. The following exemplary pigments are useful in the practice of this invention; however, this listing is not intended to limit the scope of the present invention: pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140; Cabot: Monarch® 1400, Monarch® 1300, Monarch® 1100, Monarch® 1000, Monarch® 900, Monarch® 880, Monarch® 800, and Monarch® 700; Cab-O-Jet® series of self-dispersed pigments such as Cab-O-Jet 200, 300, (black), Cab-O-Jet 1027R (red), Cab-O-Jet 554B (blue), Cab-O-Jet 270Y (yellow), Cab-O-Jet 250C (cyan), Cab-O-Jet 260M (magenta), PY-74 Yellow; Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B; Degussa: Printex U, Printex V, Printex 140U, and Printex 140V; DuPont: Tipure® R-101; Heubach: Dalamar® Yellow YT-858-D and Heucophthal® Blue G XBT-583D; Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B; Mobay: Quindo® Magenta, Indofast® Brilliant Scarlet, Quindo® Red R6700, Quindo® Red R6713, and Indofast® Violet; Sun Chem: L74-1357 Yellow, L75-1331 Yellow, and L75-2577 Yellow, Pigment Red PR122Red; Clariant Hostajet® PT and ST series (which are aqueous pigment dispersions): Hostajet Yellow 4G-PT VP 2669, Hostajet Magenta E-PT VP 2690, Hostajet Cyan BG-PT VP 2689, Hostajet Black O-PT VP 2676; Hostajet Yellow 4G-ST. VP 2745, Hostajet Magenta E-ST, Hostajet Cyan BG-ST VP 2778. Other exemplary pigments include anthraquinone red (PR177), pyrrole red (PR254), anthraqinone scarlet (PR168), quinacridone magenta (PR202), phthalocyanine green (PG36), chlorinated copper phthalocyanine green (PG7), dioxazine violet (PV23), and beta quinacridone violet (PV19); available from Companies such as Sun Chemical and Clariant.

As used herein, the term "pigment" refers to a colorant that is insoluble in the aqueous vehicle, and includes disperse dyes and self-dispersed pigments, dispersed using dispersions embodying features of the present invention. A wide variety of organic and inorganic pigments, alone or in combination, may be selected to make the ink, examples of which are disclosed in U.S. Pat. No. 5,085,698. The dispersed pigment particles are sufficiently small to permit free flow of the ink through the inkjet printing device, especially at the ejecting nozzles that usually have a diameter ranging from 10 micron to 50 micron. The particle size also has an influence on the pigment dispersion stability, which is critical throughout the life of the ink. Brownian motion of minute particles can help prevent the particles from flocculating. It is also desirable to use small particles for maximum color strength and gloss. The range of useful particle size is approximately 0.005 micron to 15 micron. Preferably, the pigment particle size should range from 0.005 to 5 micron and, next preferably, from 0.010 to 1 micron, and most preferably, from about 0.010 to 0.3 micron.

The colorant, when present in the ink, may be added to the ink in an amount generally ranging from about 0.1 to about 15%, from about 0.2 to about 10%, or from about 0.5 to about 5%, by weight, based on the total weight of the ink.

Aqueous Vehicle

The vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Representative water-soluble organic solvents that may be selected are disclosed in U.S. Pat. No. 5,085,698, the full disclosure of which is incorporated herein by reference.

More specifically, the water-soluble organic solvent may include, but is not limited to, aliphatic alcohols, aromatic alcohols, diols, glycol ethers, poly(glycol) ethers, caprolactams, formamides, acetamides, and long chain alcohols, or any mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,3-alcohols of 30 carbons or less, ethylene glycol alkyl ethers, propylene glycol alkyl ethers, poly(ethylene glycol) alkyl ethers, higher homologs of poly (ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific organic solvents that are preferably employed in the practice of this invention include, but are not limited to, N-methylpyrrolidone, 1,5-pentanediol, 2-pyrrolidone, 1-(2-hydroxyethyl)-2-pyrrolidone, diethylene glycol, 1,3-(2-methyl)-propanediol, 1,3,5-(2-methyl)-pentanetriol, tetramethylene sulfone, 3-methyl-1-butanol, glycerol, 3-pyridylcarbinol, pentaerythritol, 1,6-hexanediol, 1,2-alkyldiols, and mixtures thereof. For instance, the water-soluble organic solvent in the ink vehicle may include a mixture of diol, a polyglycol ether, and a glycol ether.

In the case of a mixture of water and at least one water-soluble solvent, the aqueous carrier medium usually comprises from about 30% to about 95% water. Generally the compositions may comprise from about 60% to about 95% water, based on the total weight of the aqueous carrier medium. The water-soluble organic solvent(s), independently, may generally be added to the liquid (e.g., ink or performance enhancing liquid) in an amount generally ranging from about 1 wt % to about 50 wt % of the total weight of the liquid formulation; from about 2 to about 45 wt %, or from about 5 to about 35 wt %.

Additional Components

Consistent with the invention, various types of additives, may be employed in the inks (or the performance optimizing liquid) to optimize the properties of the ink compositions for specific applications. The remainder of the ink composition is mostly water; however, other independently selected components including surfactants, humectants, anti-cogation additives, anti-corrosive additives, polymers, preservatives, biocides that inhibit growth of microorganisms such as the preservative PROXEL™ GXL (available from Avecia Incorporated); chelating agents (or sequestering agents) such as EDTA that eliminate deleterious effects of heavy metal impurities; buffers; and viscosity modifiers, may be added to improve various properties of the ink composition.

Buffers may be used to maintain the inkjet ink at a desired pH. The buffer may be an organic-based biological buffer or an inorganic buffer. The buffers employed are chosen to sufficiently maintain the pH in the desired range. Examples of buffers include Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO").

EXAMPLES

The general composition of exemplary polymers made for use as resins (binder and in some embodiments also the dispersant) embodying features of the invention are shown in TABLES I through V, along with exemplary ranges of amount of ingredients making up each component.

In the present application including all the tables, the following applies:

The following abbreviations refer to: AA is acrylic acid; MAA is methacrylic acid; ETEGMA is ethyltriethyleneglycolmethacrylate; Sty is styrene; BMA is butylmethacrylate; BzMA is benzylmethacrylate; IBOMA is isobornyl methacrylate.

The molecular weight is a calculated molecular weight based on the number of units as shown in TABLES I-V. Molecular weights as measured by GPC would be relative to the Styrene standards used to calibrate the system.

Random denotes random copolymers formed using standard radical reaction techniques; SCT denotes Random copolymers formed using Co-SCT complex, resulting in macromonomers with terminal olefin groups; Graft denotes Random copolymers formed using small molecule monomers and macromonomers; Block denotes Structured copolymers formed using special reaction conditions, Bold underlined text in the body of Tables denotes block A of the AB polymer; Gradient denotes Copolymers where the transition from one monomer type to another is gradual instead of sudden.

The numbers in the rows across from each monomer type indicate the average unit of each monomer type.

Examples 7-10 refer to exemplary hydrophilic macromonomers. It is further understood that styrene (Sty) may be replaced by BzMA/IBOMA mixtures. ETEGMA may also be replaced by hydrophilic monomers such as HEMA (hydroxyethyl methacrylate). Examples 11-14 are exemplary hydrophobic macromonomers. In all examples methacrylates my be replaced by acrylates, provided the backbone Tg is maintained. In all examples adhesion promoting monomers, such as those dislosued in U.S. Pat. No. 6,037,390 may be substituted for ETEGMA.

Block polymers according to Examples 15-32 may be made using macromonomers 7-14 which may be made using the monomer types described in the following tables.

By way of example, the following is a description for preparation of binders embodying features of the present invention.

Preparation of poly(t-BA/t-BMA)—Copper(I) bromide (8.66 g) was taken in a flask and saturated with nitrogen. Acetone (120 ml) was added to the above, and was followed by adding Pentamethyl diethylene triamine 'PMDETA' (13.3 ml). After a period of time, a mixture of t-butyl acrylate (90.6 g) and t-butyl methacrylate (109.4 g) was added. This new mixture was cooled to 5° C. Thereafter, the initiator methyl bromopropionate (37 ml) was added to the cooled mixture. Temperature of the mixture was maintained at 5° C. for approximately one hour. The mixture was stirred at room temperature for approximately forty one (41) hours. An NMR spectrum of the sample after one (1) hour indicated a polymerization of about 95%. The mixture was then heated to 75° C. for about one (1) hour and cooled. Acetone (80 g) was added to dilute the mixture. The mixture was filtered through neutral alumina column. The solvent was removed and the title polymer with bromo end group was obtained. The yield of the whole process was approximately 95%.

Preparation of Poly(Aa/Maa-Block-Styrene)—A Solution of Macro-initiator from Example 1 (41.16 g) in styrene (112.95 g) and toluene (40 ml) was prepared. Copper(I) chloride (2.53 g) was taken in a 500 ml flask and saturated with nitrogen. Toluene (40 ml) was added followed by PMDETA (3.9 ml). The color of mixture turned dark green indicative of the formation of copper complex. The macro-initiator containing styrene solution was added to the copper complex solution. The combined solution was heated to about 95° C. for about 6 hour. The heating was stopped and solution was cooled to room temperature. The cooled solution was diluted with hexane and filtered through neutral alumina column to remove the copper complex. The solvents and the excess styrene monomer were removed under reduced pressure. The polymer obtained was dissolved in dichloromethane (200 ml) and mixed with trifluoroacetic acid (180 g). The mixture was stirred at room temperature overnight to hydrolyze the t-butyl group as confirmed by the disappearance of t-butyl group at 1.4 ppm in a proton NMR spectrum. All or almost all of the volatile materials were removed under reduced pressure and the polymer obtained was dissolved again in tetrahydrofuran (250 ml) and precipitated in cold hexane (1.4 L). The precipitated polymer was collected and dried in vacuum at 70° C. for about 48 hours to obtain the polymer with blocks of styrene and a mixture of acrylic and methacrylic acids.

TABLE I

| Example ID | Comp 1 | Comp 2 | Ex 1 | Ex 2 | Ex 3 | Ex 4 |
|---|---|---|---|---|---|---|
| Polymer Type | Random | Random | Random | Random | Random | Random |
| Mw | 8000 | 10000 | 5840 | 7300 | 6403 | 8004 |
| AA | 11 | 14 | 11 | 14 | 11 | 14 |
| MAA | 12 | 15 | 12 | 15 | 12 | 15 |
| ETEGMA | | | | | | |
| Sty | 21 | 26 | 21 | 26 | | |
| BMA | 28 | 35 | 28 | 35 | | |
| BzMA | | | | | 28 | 35 |
| IBOMA | | | | | | |

TABLE II

| Example ID | Ex 7 | Ex 8 | Ex 9 | Ex 10 | Ex 11 | Ex 12 |
|---|---|---|---|---|---|---|
| Polymer Type | SCT | SCT | SCT | SCT | SCT | SCT |
| Mw | 2604 | 4164 | 5208 | 8328 | 3550 | 7100 |
| AA | 3 | 3 | 6 | 6 | | |
| MAA | 3 | 3 | 6 | 6 | | |
| ETEGMA | | 15 | | 30 | | |
| Sty | | | | | | |
| BMA | 15 | | 30 | | 25 | 50 |
| BzMA | | | | | | |
| IBOMA | | | | | | |

TABLE III

| Example ID | Ex 13 | Ex 14 | Ex 15 | Ex 16 | Ex 17 | Ex 18 |
|---|---|---|---|---|---|---|
| Polymer Type | Graft | Graft | Graft | Graft | Graft | Graft |
| Mw | 17516 | 23756 | 55864 | 80824 | 20636 | 68344 |
| AA | | | | | | |
| MAA | | | | | | |
| ETEGMA | | | | | | |
| Sty | | | | | | |
| BMA | 50 | 50 | 100 | 100 | 50 | 100 |
| BzMA | | | | | | |
| IBOMA | | | | | | |
| Ex 7 | 4 | | | | 2 | |
| Ex 8 | | 4 | | | 2 | |
| Ex 9 | | | 9 | | | 4 |
| Ex 10 | | | | 8 | | 4 |

TABLE IV

| Example ID | Ex 19 | Ex 20 | Ex 21 | Ex 22 | Ex 23 | Ex 24 | Ex 25 | Ex 26 |
|---|---|---|---|---|---|---|---|---|
| Polymer Type | Block | Block | Block | Block | Block | Block | Block | Block |
| Mw | 17516 | 23756 | 55864 | 80824 | 24460 | 41820 | 17360 | 20520 |
| AA | | | | | 20 | 40 | 20 | 40 |
| MAA | | | | | 20 | 40 | 20 | 40 |
| ETEGMA | | | | | | | | |
| Sty | | | | | | | | |
| BMA | 50 | 50 | 100 | 100 | 50 | 50 | 100 | 100 |
| BzMA | | | | | | | | |
| IBOMA | | | | | | | | |
| Ex 7 | 4 | | | | | | | |
| Ex 8 | | 4 | | | | | | |
| Ex 9 | | | 8 | | | | | |
| Ex 10 | | | | 8 | | | | |
| Ex 11 | | | | | 4 | | | |
| Ex 12 | | | | | | 4 | | |
| Ex 13 | | | | | | | | |
| Ex 14 | | | | | | | | |

TABLE V

| Example ID | Ex 27 | Ex 28 | Ex 29 | Ex 30 |
|---|---|---|---|---|
| Polymer Type | Block | Block | Block | Block |
| Mw | 34876 | 58476 | 59024 | 87144 |
| AA | 20 | 40 | 20 | 40 |
| MAA | 20 | 40 | 20 | 40 |
| ETEGMA | | | | |
| Sty | | | | |
| BMA | 50 | 50 | 100 | 100 |
| BzMA | | | | |
| IBOMA | | | | |
| Ex 7 | 4 | | | |
| Ex 8 | | 4 | | |
| Ex 9 | | | 8 | |
| Ex 10 | | | | 10 |
| Ex 11 | 4 | | | |
| Ex 12 | | 4 | | |
| Ex 13 | | | | |
| Ex 14 | | | | |

Acid numbers were measured for select resin polymers as described below in order to asses the number of acid sites on the polymer, the results of which are shown in TABLE VI. An exemplary method for measuring the acid number included weighing about 100 mill-grams (mg) of the polymer and dissolving in a 50 milliliters (ml) of THF and 25 ml of IPA in a titration beaker mounted on a Mettler DL77 titrator. Ten (10) ml of water was slowly added to the solution while mixing. For sample P3, an additional 25 ml (total of 75 ml) was used to keep the polymer dissolved prior to titration. A titrant of 0.500N KOH was added to the polymer solution using a Mettler SC115 combination pH electrode and buret tip (1 ml buret). The solution was titrated in the dynamic equilibrium mode to the end of the titration.

TABLE VI

| Polymer Sample ID | Polymer Type | Average Molecular weight (Mw) | Meq of KOH/g polymer | mg of KOH/g polymer |
|---|---|---|---|---|
| P1 | Benzylmethacrylate- | $6.3 \times 10^3$ | 0.92 | 51 |
| P2 | block-Acrylic | $6.0 \times 10^3$ | 1.30 | 73 |
| P3 | Acid/Methacrylic Acid | $2.3 \times 10^3$ | 1.43 | 80 |
| P4 | Styrene-block-Acrylic | $9.2 \times 10^3$ | 1.55 | 87 |
| P5 | Acid/Methacrylic Acid | $2.2 \times 10^3$ | 2.13 | 119 |

In an effort to assess the print quality performance, namely bronzing performance, of inks formulated using resin polymers according to the present invention as binders, several photo-quality light gray inks were formulated. The general compositions and the visually evaluated bronzing performance are reported TABLE VII. As can be seen from the results in TABLE VII, inks prepared according to the present invention demonstrated improved bronzing performance as indicated by lower numbers.

TABLE VII

| | Ink Sample ID | | | |
|---|---|---|---|---|
| | Control | S1 | S2 | S3 |
| Cyan Pigment | 0.092 | 0.092 | 0.092 | 0.092 |
| Black Pigment | 0.418 | 0.418 | 0.418 | 0.418 |
| Violet Pigment | 0.071 | 0.071 | 0.071 | 0.071 |
| Proxel GXL | 0.15 | 0.15 | 0.15 | 0.15 |
| Diethylene glycol | 3 | 3 | 3 | 3 |
| LEG-1 | 3 | 3 | 3 | 3 |
| 2-P | 6 | 6 | 6 | 6 |
| Glycerol | 5 | 5 | 5 | 5 |
| 1,2 Hexanediol | 4 | 4 | 4 | 4 |
| Fluoro Surfactant | 0.17 | 0.17 | 0.17 | 0.17 |
| TEA | 0.8 | 0.8 | 0.8 | 0.8 |
| Hydrocarbon Surfactant | 0.5 | 0.5 | 0.5 | 0.5 |
| Binder SMA 1440 | 1.5 | | | |
| Polymer Binder P2 | | 1.5 | | |
| Polymer Binder P3 | | | 1.5 | |
| Polymer Binder P5 | | | | 1.5 |
| Water | balance | balance | balance | balance |
| Total | 100 | 100 | 100 | 100 |
| Bronzing Performance Score (lower score is better) | 5 | 1 | 1 | 3 |

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

Terms such a "element," "member," "component," "device," "section," "portion," "step," "means," and words of similar import, when used herein shall not be construed as invoking the provisions of 35 U.S.C. §112(6) unless the following claims expressly use the term "means" followed by a particular function without specific structure or the term "step" followed by a particular function without specific action. Accordingly, it is not intended that the invention be limited, except as by the appended claims. All patents and patent applications referred to herein are hereby incorporated by reference in their entirety.

What is claimed is:

1. An ink, comprising:
   a. an aqueous vehicle;
   b. at least one encapsulant-dispersed pigment; and
   c. at least one block copolymer binder dispersed throughout the aqueous having Structure VI and comprising a hydrophobic block (A) and a hydrophilic block (B);

STRUCTURE VI

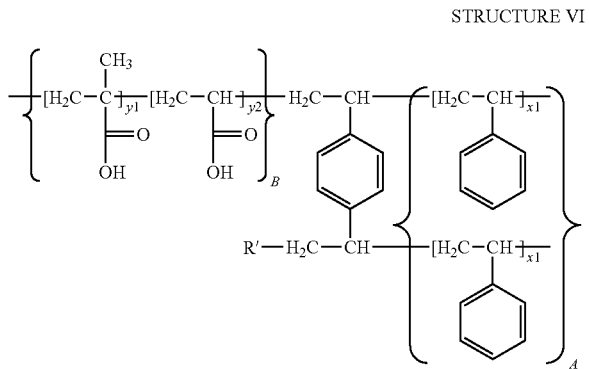

wherein, structure VI includes a bifunctional styrene/acrylate/methacrylate to form a double chained dispersant, wherein the double chains may be hydrophobic or hydrophilic segments;

R' is halogen or alkyl derivative group provided that when a vinyl benzyl chloride group is used, R'—CH2 is not present and the R'CH2CH group becomes CH2;

x1 is independently selected to be equal or greater than one; and y1 and y2 are independently selected to be equal to or greater than one.

2. An ink according to claim 1, wherein the encapsulant has the same chemical structure as the binder.

3. The ink of claim 1, wherein the block copolymer binder has a molecular weight ranging from about 1,000 Mw to about 20,000 Mw.

4. The ink of claim 1, wherein the block copolymer binder has an acid number ranging from about 130 to about 200 mg KOH/g polymer.

* * * * *